United States Patent
Azuma (10) Patent No.: US 8,126,514 B2
(45) Date of Patent: Feb. 28, 2012

(54) IN-VEHICLE APPARATUS, CELLULAR PHONE DEVICE, AND METHOD FOR CONTROLLING COMMUNICATION THEREBETWEEN

(75) Inventor: Kazuyoshi Azuma, Kariya (JP)

(73) Assignee: Denso Corporation, Kariya (JP)

( * ) Notice: Subject to any disclaimer, the term of this patent is extended or adjusted under 35 U.S.C. 154(b) by 344 days.

(21) Appl. No.: 12/590,974

(22) Filed: Nov. 17, 2009

(65) Prior Publication Data

US 2010/0144397 A1    Jun. 10, 2010

(30) Foreign Application Priority Data

Dec. 4, 2008    (JP) ................................ 2008-309656

(51) Int. Cl.
*H04M 1/00*    (2006.01)
(52) U.S. Cl. ....................... 455/569.2; 455/557; 455/575
(58) Field of Classification Search ................. 455/569.2
See application file for complete search history.

(56) References Cited

U.S. PATENT DOCUMENTS

| | | | |
|---|---|---|---|
| 6,304,764 B1 * | 10/2001 | Pan ............................ | 455/569.2 |
| 2007/0135175 A1 | 6/2007 | Matsuda | |

FOREIGN PATENT DOCUMENTS

| | | |
|---|---|---|
| JP | 2003-151075 | 5/2003 |
| JP | 2006-174290 | 6/2006 |
| JP | 2006-184108 | 7/2006 |
| JP | 2006-287644 | 10/2006 |
| JP | 2008-205573 | 9/2008 |

OTHER PUBLICATIONS

Office action dated Nov. 9, 2010 in corresponding Japanese Application No. 2008-309656.

* cited by examiner

*Primary Examiner* — Duc Nguyen
*Assistant Examiner* — Ajibola Akinyemi
(74) *Attorney, Agent, or Firm* — Harness, Dickey & Pierce, PLC (57) ABSTRACT

A communication unit communicates with a cellular phone device simultaneously using a handsfree communication protocol for handsfree communication and a data transfer protocol for data transfer. The cellular phone device is selectively in one of: i) a handsfree communication state where outgoing and incoming voice is transmitted via input and output units of the in-vehicle apparatus when opening a voice path with the in-vehicle apparatus using the handsfree communication protocol; and ii) a handset communication state where outgoing and incoming voice is transmitted via input and output units of the cellular phone device when closing the voice path. A control unit permits a data transfer request transmitted from the cellular phone device using the data transfer protocol when the cellular phone device is in the handset communication state and refuses the data transfer request when the cellular phone device is in the handsfree communication state.

4 Claims, 5 Drawing Sheets

FIG. 8

IN-VEHICLE APPARATUS, CELLULAR PHONE DEVICE, AND METHOD FOR CONTROLLING COMMUNICATION THEREBETWEEN

CROSS REFERENCE TO RELATED APPLICATIONS

This application is based on and incorporates herein by reference Japanese Patent Applications No. 2008-309656 filed on Dec. 4, 2008.

FIELD OF THE INVENTION

The present invention relates to an in-vehicle apparatus having a handsfree function and configured to communicate with a cellular phone device simultaneously using a handsfree communication protocol for handsfree communication and a data transfer protocol for data transfer. The present invention further relates to a cellular phone device configured to communicate with the in-vehicle apparatus simultaneously using the handsfree communication protocol and the data transfer protocol. The present invention further relates to a method for controlling communication between the in-vehicle apparatus and the cellular phone device. The present invention further relates to a program product including the method.

BACKGROUND OF THE INVENTION

For example, JP-B-2-3846275 discloses an in-vehicle apparatus and a cellular phone device having a wireless-communications function. The in-vehicle apparatus of JP-B-2-3846275 mounted in a vehicle receives position data from the cellular phone device located inside the vehicle. Thereby, the in-vehicle apparatus sets a point, which is specified by the position data, as a destination, and the in-vehicle apparatus performs route guidance to the destination.

In the structure of JP-B-2-3846275, the cellular phone device is conceived to employ Bluetooth (BT: registered trademark) as a wireless communication system for transmitting the position data to the in-vehicle apparatus. In this case, the in-vehicle apparatus is conceived to employ the object push profile (OPP) used by the cellular phone device for transmitting the position data. The Object Push Profile (OPP) is defined by the telecommunications standard of Bluetooth for data transfer. When the cellular phone device communicates with the in-vehicle apparatus using the OPP, it is supposed that the cellular phone device is manipulated to transmit the position data to the in-vehicle apparatus. A cellular phone device in a vehicle may be mainly used in a mode of a handsfree communication. When an in-vehicle apparatus having a handsfree function performs a concurrent communication with a cellular phone device using the handsfree profile (HFP), a user can cause the cellular phone device to transmit position data to the in-vehicle apparatus while performing handsfree communication. The handsfree profile (HFP) is defined by the telecommunications standard of OPP and BT for handsfree communication.

When the in-vehicle apparatus communicates with the cellular phone device using the HFP, a user is one of a handsfree communication state and a handset communication state. When a user is in the handsfree communication state, a user communicates with a counterpart using a microphone and a speaker of the in-vehicle apparatus. When a user is in the handset communication state, a user communicates with a counterpart using a microphone and a speaker of the cellular phone device. It is assumed that a user is driving a vehicle when being in the handsfree communication state. Alternatively, it is assumed that a user is stopping a vehicle when being in the handset communication state.

Therefore, it is hard to conceive a user to cause a cellular phone device to transmit position data to an in-vehicle apparatus when being in the handsfree communication state, since the user is conceived to be driving a vehicle. Nevertheless, when the user is in the handsfree communication state, it is conceived that an occupant other than the user may manipulate the cellular phone device to cause the cellular phone device to transmit position data to the in-vehicle apparatus. More specifically, an occupant other than the user may cause the cellular phone device in the handsfree communication state to transmit position data to the in-vehicle apparatus, and consequently, the in-vehicle apparatus receiving the position data from the cellular phone device may execute an application program. For example, the application program may request the user to determine whether to set a point specified by the position data as a destination. In this case, a user cannot concentrate on driving of the vehicle. On the other hand, when the user is in the handset communication state, the vehicle is supposed to be stopping. In this case, even when the user or the occupant causes the cellular phone device to transmit position data to the in-vehicle apparatus, it does not cause a problem such as interference to a driving operation.

SUMMARY OF THE INVENTION

In view of the foregoing and other problems, it is an object of the present invention to produce an in-vehicle apparatus and a cellular phone device having a handsfree function, which enables a user to appropriately operate the same when the cellular phone device in a handsfree communication state makes a data transfer request. It is an object of the present invention to produce a method for controlling communication between the in-vehicle apparatus and the cellular phone device. It is an object of the present invention to produce a program product including the method.

According to one aspect of the present invention, an in-vehicle apparatus having a handsfree function, the in-vehicle apparatus comprises a communication unit configured to communicate with a cellular phone device simultaneously using a handsfree communication protocol for handsfree communication and a data transfer protocol for data transfer, the cellular phone device being selectively in one of: i) a handsfree communication state where outgoing voice inputted via a voice input unit of the in-vehicle apparatus is transmitted to a counterpart and incoming voice transmitted from a counterpart is outputted via a voice output unit of the in-vehicle apparatus when opening a voice path with the in-vehicle apparatus and when communicating with the in-vehicle apparatus using a handsfree communication protocol; and ii) a handset communication state where outgoing voice inputted via a voice input unit of the cellular phone device is transmitted to a counterpart, and incoming voice transmitted from a counterpart is outputted via a voice output unit of the cellular phone device when closing the voice path with the in-vehicle apparatus. The in-vehicle apparatus further comprises a request determination unit configured to determine whether the cellular phone device, which communicates with the communication unit using the data transfer protocol, makes a data transfer request. The in-vehicle apparatus further comprises a condition determination unit configured to determine whether the cellular phone device, which communicates with the communication unit using the handsfree communication protocol, is in one of the handsfree communication state and the handset communication state. The in-vehicle apparatus further comprises a control unit configured to i) permit the data transfer request from the cellular phone device in a condition where: the request determination unit determines that the cellular phone device, which communicates with the communication unit using the data transfer protocol, makes a data transfer request; and the condition determination unit determines that the cellular phone device is in the handset communication state, and ii) refuse the data transfer request from the cellular phone device in a condition where: the condition determination unit determines that the cellular phone device is in the handsfree communication state.

According to another aspect of the present invention, a cellular phone device is configured to communicate with an in-vehicle apparatus having a handsfree function simultaneously using a handsfree communication protocol for handsfree communication and a data transfer protocol for data transfer. The cellular phone device is selectively in one of: i) a handsfree communication state where voice inputted via a voice input unit of the in-vehicle apparatus is transmitted as outgoing voice to a counterpart, and voice transmitted from a counterpart is outputted as incoming voice via a voice output unit of the in-vehicle apparatus by opening a voice path with the in-vehicle apparatus in a condition where communicating using the handsfree communication protocol; and ii) a handset communication state where voice inputted via a voice input unit of the cellular phone device is transmitted as outgoing voice to a counterpart, and voice transmitted from a counterpart is outputted as incoming voice via a voice output unit of the cellular phone device by closing the voice path with the in-vehicle apparatus. The cellular phone device performs data transfer to the in-vehicle apparatus in a condition where: i) the cellular phone device communicates with the in-vehicle apparatus simultaneously using the handsfree communication protocol and the data transfer protocol; ii) the cellular phone device is in the handset communication state; and iii) the cellular phone device makes a data transfer request to the in-vehicle apparatus. The cellular phone device do not perform data transfer to the in-vehicle apparatus in a condition where: the cellular phone device is in the handsfree communication state; and the cellular phone device makes a data transfer request to the in-vehicle apparatus.

According to another aspect of the present invention, an in-vehicle apparatus comprises a communication unit configured to communicate with a cellular phone device simultaneously using a handsfree communication protocol for handsfree communication and a data transfer protocol for data transfer, the cellular phone device being selectively in one of: i) a handsfree communication state where outgoing and incoming voice is transmitted via input and output units of the in-vehicle apparatus when opening a voice path with the in-vehicle apparatus using the handsfree communication protocol; and ii) a handset communication state where outgoing and incoming voice is transmitted via input and output units of the cellular phone device when closing the voice path. The in-vehicle apparatus further comprises a condition determination unit configured to determine whether the cellular phone device is in one of the handsfree communication state and the handset communication state. The in-vehicle apparatus further comprises a control unit configured to: i) permit a data transfer request transmitted from the cellular phone device using the data transfer protocol in response to determination of the condition determination unit that the cellular phone device is in the handset communication state; and ii) refuse the data transfer request from the cellular phone device in response to determination of the condition determination unit that the cellular phone device is in the handsfree communication state.

According to another aspect of the present invention, a cellular phone device is configured to communicate with an in-vehicle apparatus simultaneously using a handsfree communication protocol for handsfree communication and a data transfer protocol for data transfer. The cellular phone device is selectively in one of: i) a handsfree communication state where outgoing and incoming voice is transmitted via input and output units of the in-vehicle apparatus when opening a voice path with the in-vehicle apparatus using the handsfree communication protocol; and ii) a handset communication state where outgoing and incoming voice is transmitted via input and output units of the cellular phone device when closing the voice path. The cellular phone device is configured to: i) perform data transfer to the in-vehicle apparatus when being in the handset communication state and communicating with the in-vehicle apparatus simultaneously using the handsfree communication protocol and the data transfer protocol; and ii) prohibit data transfer to the in-vehicle apparatus when being in the handsfree communication state.

According to another aspect of the present invention, a method for controlling communication between an in-vehicle apparatus and a cellular phone device, the method comprises communicating the in-vehicle apparatus with the cellular phone device simultaneously using a handsfree communication protocol for handsfree communication and a data transfer protocol for data transfer. The method further comprises determining whether the cellular phone device is in one of: i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and ii) a handset communication state where outgoing and incoming voice is transmitted via input and output units of the cellular phone device when closing the voice path. The method further comprises determining whether the cellular phone device makes a data transfer request using the data transfer protocol. The method further comprises permitting the data transfer request in response to determination that the cellular phone device makes the data transfer request using the data transfer protocol and determination that the cellular phone device is in the handset communication state. The method further comprises refusing the data transfer request in response to determination that the cellular phone device is in the handsfree communication state.

According to another aspect of the present invention, a method for controlling communication between a cellular phone device and an in-vehicle apparatus, the method comprises communicating the cellular phone device with the in-vehicle apparatus simultaneously using a handsfree communication protocol for handsfree communication and a data transfer protocol for data transfer. The method further comprises determining whether the cellular phone device is in one of: i) a handsfree communication state where outgoing and incoming voice is transmitted via input and output units of the in-vehicle apparatus when opening a voice path with the in-vehicle apparatus and communicating with the in-vehicle apparatus using the handsfree communication protocol; and ii) a handset communication state where outgoing and incoming voice is transmitted via input and output units of the cellular phone device when closing the voice path. The method further comprises performing data transfer from the cellular phone device to the in-vehicle apparatus using the data transfer protocol in response to determination that the cellular phone device is in the handset communication state. The method further comprises prohibiting data transfer from the cellular phone device to the in-vehicle apparatus using the data transfer protocol in response to determination that the cellular phone device is in the handsfree communication state.

According to another aspect of the present invention, a program product comprising instructions being executed by a computer, the instructions including the method for controlling communication between a cellular phone device and an in-vehicle apparatus.

According to another aspect of the present invention, a program product comprising instructions being executed by a computer, the instructions including the method for controlling communication between an in-vehicle apparatus and a cellular phone device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, an embodiment will be described with reference to drawings. In the present description, it is assumed that a vehicle has an in-vehicle navigation device having a handsfree function of a Bluetooth (BT: registered trademark) communication function. The in-vehicle navigation device is an example of an in-vehicle apparatus with a handsfree function. Further, a cellular-phone device having the BT communication function is carried into an interior of the vehicle. In the present state, the in-vehicle navigation device and the cellular phone device are communicable via the BT communication function.

Figure 1:
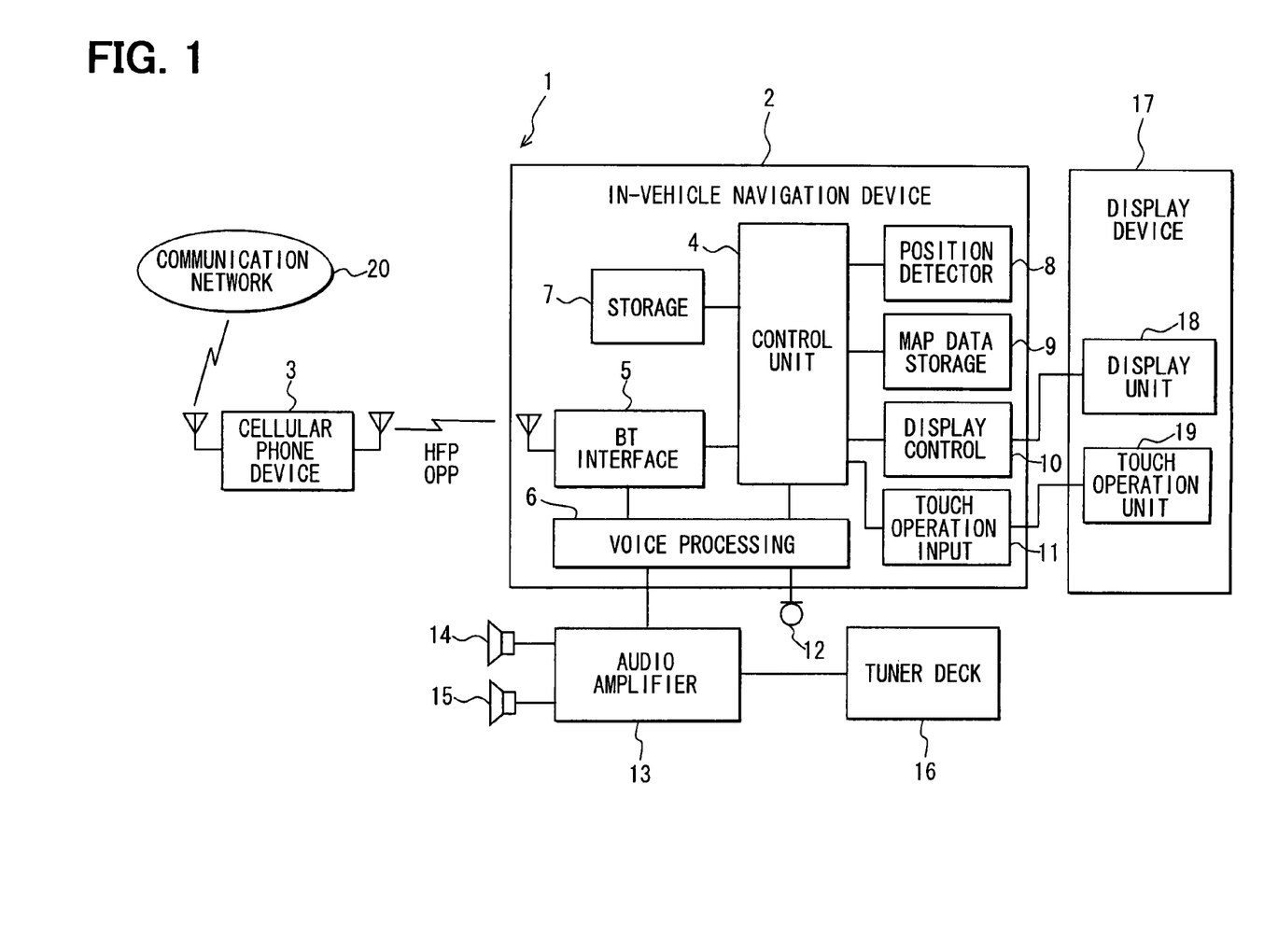
FIG. 1 is a functional block diagram showing an in-vehicle apparatus and a cellular phone device according to an embodiment of the present invention.

An in-vehicle navigation system 1 includes an in-vehicle navigation device 2 and a cellular phone device 3. The in-vehicle navigation device 2 includes a control unit 4, a BT interface portion 5, a telephone voice processing portion 6, a storage portion 7, and a position detector portion 8, a map data storage portion 9, a display control portion 10, and a touch operation input portion 11. The control unit 4 is an example of a data transfer request determination unit, a condition determination unit, a control unit, and a route guide unit. The BT interface portion 5 is an example of a connection unit, a position data reception unit. The position detector portion 8 is an example of a current position acquisition unit.

The control unit 4 may be a generally-known microcomputer including a CPU, a RAM, a ROM, an I/O bus, and the like. The control unit 4 controls an operation such as a communication and a data management of the in-vehicle navigation device 2. The BT interface portion 5 has a function to perform a BT communication with the cellular phone device 3. Specifically, the BT interface portion 5 can use the handsfree profile (HFP) for performing handsfree telephone call and the object push profile (OPP) for transmission of various data. The HFP and the OPP are defined by the telecommunications standard of BT. The HFP is an example of a handsfree telephone call protocol. The OPP is an example of a data transfer protocol. The BT interface portion 5 is capable of cocurrent connection (multi-connection) of the HFP and the OPP. In addition to the HFP and the OPP, the BT interface portion 5 may further use the phone book access profile (PBAP), the message access profile (MAP), and the like. The phone book access profile (PBAP) is used for transmission of telephone directory data, outgoing history data, and incoming history data. The message access profile (MAP) is used for mail transfer. The present profiles are communication protocols assigned respectively to functions.

The telephone voice processing portion 6 is connected with a microphone 12 and an audio amplifier 13. The microphone 12 is located in the vehicle interior. More specifically, for example, the microphone 12 is located such that the microphone 12 can easily collect voice of a user close to a handle. The audio amplifier 13 is an exterior device of the in-vehicle navigation device 2 and connected with two speakers 14 and 15. The microphone 12 is an example of a voice input unit at the side of the in-vehicle apparatus with the handsfree function. The two speakers 14 and 15 are examples of a voice output unit at the side of the in-vehicle apparatus with the handsfree function. The speakers 14 and 15 may be symmetric with respect to the longitudinal direction of the vehicle equipped with the in-vehicle navigation device 2. For example, one speaker 14 is located at a door of a driver's seat, and the other speaker 15 is located at a door of a passenger's seat. The audio amplifier 13 is further connected with a tuner deck 16. For example, the audio amplifier 13 inputs an audio signal of audio contents such as a music content obtained from a recording medium and a radio program received from a radio station using the tuner deck 16. The audio amplifier 13 amplifies the audio signal and thereby to output the audio contents via the speakers 14 and 15.

The storage portion 7 is capable of storing various data. For example, the storage portion 7 is capable of storing the telephone directory data, the outgoing history data, and the incoming history data, for example. The telephone directory data specifies correspondence between a telephone number and a registered name. The outgoing history data specifies correspondence between outgoing time (time of origin) and an outgoing telephone number. The outgoing telephone number is related to an outgoing operation (transmission) from the in-vehicle navigation device 2 or to an outgoing operation from the cellular phone device 3, which is connected with the in-vehicle navigation device 2 via the HFP. The incoming history data specifies correspondence between incoming time and an incoming telephone number. The incoming telephone number is related to an incoming operation (reception) of the cellular phone device 3, which is connected with the in-vehicle navigation device 2 via the HFP.

The position detector portion 8 includes a global positioning system (GPS) receiver, a gravity sensor (G sensor), a distance sensor, and the like. The GPS receiver receives a GPS electric wave signal transmitted from a GPS satellite and calculates various parameters based on the received signal. The G sensor detects acceleration of the vehicle. The distance sensor detects a travel distance. The position detector portion 8 obtains a current position of the vehicle based on a computation result of the GPS receiver and detection signals of various sensors. The position detector portion 8 outputs a position data specifying the obtained current position to the control unit 4. The map data storage portion 9 stores road data, generally-known map data, and the like. The road data specifies a construction condition of a road, a number of lanes of a road, and the like. The map data includes intersection data specifying a location of an intersection, a shape of an intersection, and the like.

A display device 17 includes a display unit 18 and a touch operation unit 19. The display unit 18 displays various information. The touch operation unit 19 has a touch sensor on a display screen. The display control portion 10 inputs an instruction from the control unit 4 and controls indication of information on the display unit 18 of the display device 17 based on the inputted instruction. The touch operation input portion 11 inputs instruction of a user according to a user's operation of the touch sensor of the touch operation unit 19 via the display screen. The touch operation input portion 11 outputs the inputted instruction to the control unit 4. The control unit 4 analyzes the instruction inputted from the touch operation input portion 11.

The control unit 4 has a generally-known navigation function. The navigation function includes a function to superimpose the current position, which is obtained based on the position data inputted from the position detector portion 8, on a map, which is specified by the map data read from the map data storage portion 9. The navigation function further includes a function to notify a user of the current position of the vehicle approaching an intersection. The navigation function further includes a function to set a destination to a point related to information, which is inputted by a user via the touch operation input portion 11. The user may input the information by touching an indication such as a name and a telephone number on the touch operation input portion 11. The navigation function further includes a function to perform a route search from a current position to a destination. The navigation function further includes a function to perform a route guidance according to the route searched by the route search.

The cellular phone device 3 includes a control unit, a telecommunication portion, a BT interface portion, a key portion, a storage portion, an indication portion, a microphone, a speaker, and the like. The control unit controls of an entire operation of the cellular phone device 3. The telecommunication portion performs telephonic communication with a communication network 20. The BT interface portion performs BT communication. The key portion includes various keys arranged on the key portion and operated by a user. The storage portion stores various data such as telephone directory data specifying correspondence between a telephone number and a registered name. The indication portion displays various information on a display screen. The microphone inputs voice of a user. The speaker outputs voice received from a counterpart. The microphone is an example of a voice input unit of the cellular phone device. The speaker is an example of a voice output unit of the cellular phone device. In the present embodiment, the BT interface portion of the cellular phone device 3 has a function to perform the BT communication with the in-vehicle navigation device 2. Similarly to the BT interface portion 5 of the in-vehicle navigation device 2, the BT interface portion of the cellular phone device 3 can use the HFP and the OPP and communicate with the in-vehicle navigation device 2 simultaneously using the HFP and the OPP. Further, the cellular phone device 3 includes a GPS receiver and has a function to detect the current position of the cellular phone device 3 and a function to transmit position data specifying the detected current position to an external device via the BT interface portion in response to an operation of a user.

As follows, an operation when the in-vehicle navigation device 2 is communicable with the cellular phone device 3 via the HFP and when the cellular phone device 3 receives incoming call from the communication network 20 will be described. The communication network 20 includes a cellular-phone base station and a facility, which provides a generally-known communication service, such as a base station control, for a cellular phone.

When the cellular phone device 3 is connected with the in-vehicle navigation device 2 via the HFP and when the cellular phone device 3 detects incoming call received from the communication network 20, the cellular phone device 3 transmits notice of incoming call to the in-vehicle navigation device 2 for notifying the incoming call. In response to the notification, the cellular phone device 3 transmits notice of incoming call to the in-vehicle navigation device 2. The notice of incoming call includes identification information such as a telephone number stored in the cellular phone device 3 for identifying the cellular phone device 3. In this case, when the cellular phone device 3 receives a telephone number of a counterpart from the communication network 20, the cellular phone device 3 transmits notice of incoming call to the in-vehicle navigation device 2. The notice of incoming call includes a telephone number of a counterpart received from the communication network 20. When the cellular phone device 3 can use in-band ringtone, the cellular phone device 3 further transmit ringtone stored in the cellular phone device 3 to the in-vehicle navigation device 2.

In the in-vehicle navigation device 2, the control unit 4 causes the speakers 14 and 15 to output ringtone stored in the in-vehicle navigation device 2 when receiving notice of incoming call from the cellular phone device 3 via the BT interface portion 5 and when not receiving ringtone from the cellular phone device 3. Alternatively, the control unit 4 causes the speakers 14 and 15 to output ringtone, which is stored in the cellular phone device 3 and received from the cellular phone device 3, when receiving notice of incoming call and the ringtone from the cellular phone device 3 via the BT interface portion 5. Thereby, a user is notified of incoming call received by the cellular phone device 3. Further, as shown in FIG. 2, the control unit 4 causes the display unit 18 to display an incoming call notice screen 21, which indicates a state where the cellular phone device 3 receives the incoming call.

Thereby, a user can recognize the state where the cellular phone device 3 receives the incoming call by hearing the ringtone outputted from the speakers 14 and 15 and viewing the incoming call notice screen 21 displayed on the display unit 18. In response to recognition of the user that the cellular phone device 3 receives the incoming call, the user can select either responding to the incoming call of the cellular phone device 3 by handsfree communication or refusing the incoming call by manipulating the in-vehicle navigation device 2. Alternatively, in this case, the user can select either responding to the incoming call of the cellular phone device 3 by private communication (handset communication) or refusing the incoming call by manipulating the cellular phone device 3. The handsfree communication is performed by transmitting and receiving voice using the microphone 12 and the speakers 14 and 15 connected with the in-vehicle navigation device 2 in a condition where the cellular phone device 3 and the in-vehicle navigation device 2 therebetween open a voice path. The private communication is performed by transmitting and receiving voice using the microphone and the speaker of the cellular phone device 3 in a condition where the cellular phone device 3 and the in-vehicle navigation device 2 therebetween close the voice path.

Figure 2:
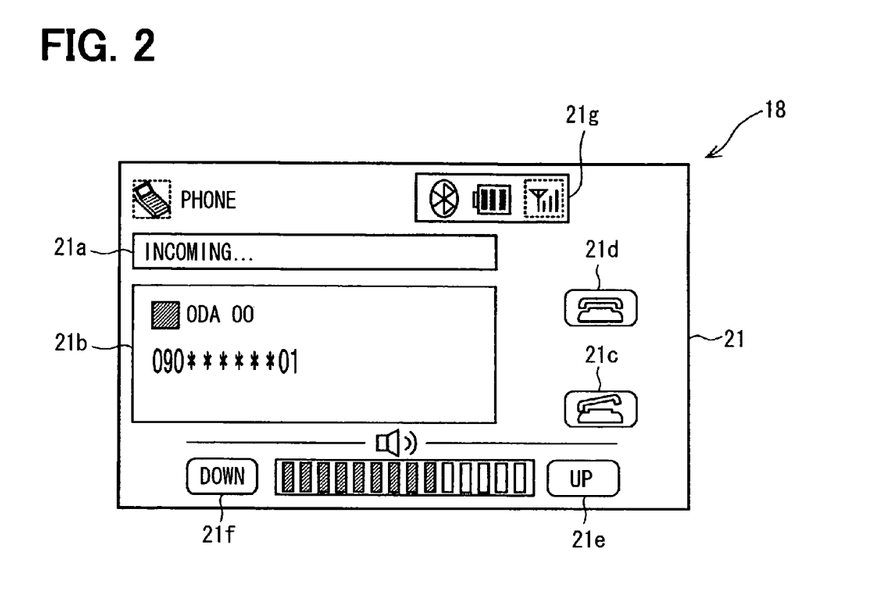
FIG. 2 is a schematic view showing an incoming call notice screen.

In FIG. 2, the cellular phone device 3 receives incoming call from the communication network 20, and the in-vehicle navigation device 2 receives the number of "090****01" as a telephone number of a sender (outgoing side) of the incoming call from the cellular phone device 3. Further, in FIG. 2, the letter string of "Oda OO" is a registered name corresponding to the telephone number of the sender received from the cellular phone device 3. The letter string of "Oda OO" is stored as telephone directory data. The incoming call notice screen 21 displays a condition where the cellular phone device 3 receives incoming call. Specifically, the control unit 4 causes a status display region 21a of the incoming call notice screen 21 to display a letter string of "Receiving Incoming Call" to notify a condition where the cellular phone device 3 receives incoming call. Further, the control unit 4 causes a sender information display region 21b to display the letter strings of "090****01" and "Oda OO" as information of the sender.

Further, the control unit 4 causes the incoming call notice screen 21 to display a response switch 21c, a response refusal switch 21d, an up switch 21e, and a down switch 21f. The response switch 21c is manipulated when a user respond to incoming call. The response refusal switch 21d is manipulated when a user refuses incoming call. The up switch 21e is manipulated when a user increases volume of ringtone outputted from the speakers 14 and 15. The down switch 21f is manipulated when a user decreases volume of ringtone outputted from the speakers 14 and 15. Further, the control unit 4 receives remaining power of a battery of the cellular phone device 3 and a reception status of electric wave from the cellular phone device 3 receiving incoming call. The control unit 4 causes a phone status display region 21g to display a remaining power icon and a reception status icon. The remaining power icon indicates the remaining power of the battery of the cellular phone device 3. The reception status icon indicates the reception status of electric wave.

When the cellular phone device 3 receives incoming call and the cellular phone device 3 is in an incoming call state, a user can:

respond to the incoming call of the cellular phone device 3 via the handsfree communication by manipulating the response switch 21c of the incoming call notice screen 21;

refuse the incoming call of the cellular phone device 3 by manipulating the response refusal switch 21d of the incoming call notice screen 21;

respond to the incoming call of the cellular phone device 3 via the private communication by manipulating a response key of the cellular phone device 3; and refuse the incoming call of the cellular phone device 3 by manipulating a response refusal key of the cellular phone device 3.

Figure 3:
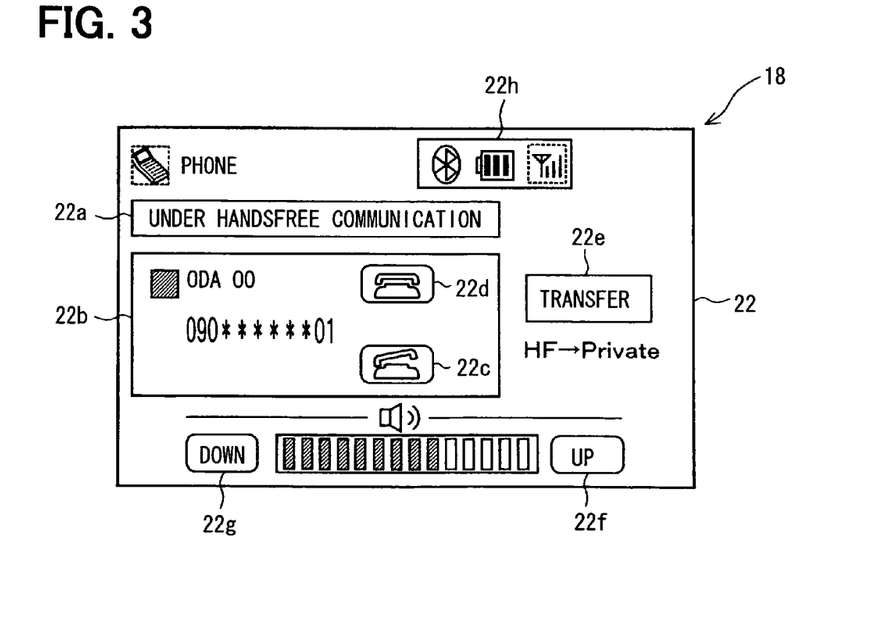
FIG. 3 is a schematic view showing an under handsfree communication notice screen.

FIG. 3 shows a state where a user manipulates the response switch 21c of the incoming call notice screen 21 (FIG. 3) and responds to the incoming call of the cellular phone device 3 via the handsfree communication. When the control unit 4 determines that a user manipulates the response switch 21c of the incoming call notice screen 21, the control unit 4 causes: the cellular phone device 3 to perform a response operation to the incoming call; and the BT interface portion 5 and the cellular phone device 3 therebetween to open a voice path. After the cellular phone device 3 changes from the incoming call state to a handsfree communication state where the cellular phone device 3 performs the handsfree communication, the control unit 4 changes the incoming call notice screen 21 shown in FIG. 2 to a under handsfree communication notice screen 22 shown in FIG. 3. The under handsfree communication notice screen 22 indicates the handsfree communication state.

The control unit 4 causes a status display region 22a of the under handsfree communication notice screen 22 to display a letter string of "Under Handsfree Communication" to notify the handsfree communication state. Further, the control unit 4 causes a sender information display region 22b to display the letter strings of "090******01" and "Oda OO" as information of the sender. Further, the control unit 4 causes the under handsfree communication notice screen 22 to display a hold switch 22c, a hang up switch 22d, a transfer switch 22e, an up switch 22f, and a down switch 22g. The hold switch 22c is manipulated when a user holds (suspends) the handsfree communication. The hang up switch 22d is manipulated when a user terminates the handsfree communication to hang up the incoming call. The transfer switch 22e is manipulated when a user changes the handsfree communication to the private communication to transmit the incoming call to the cellular phone device 3. The up switch 22f is manipulated when a user increases volume of the incoming voice outputted from the speakers 14 and 15. The down switch 22g is manipulated when a user decrease volume of the incoming voice outputted from the speakers 14 and 15. Further, the control unit 4 receives remaining power of a battery of the cellular phone device 3 and a reception status of electric wave from the cellular phone device 3. The control unit 4 causes a phone status display region 22h to display a remaining power icon and a reception status icon. The remaining power icon indicates the remaining power of the battery of the cellular phone device 3. The reception status icon indicates the reception status of electric wave.

Figure 4:
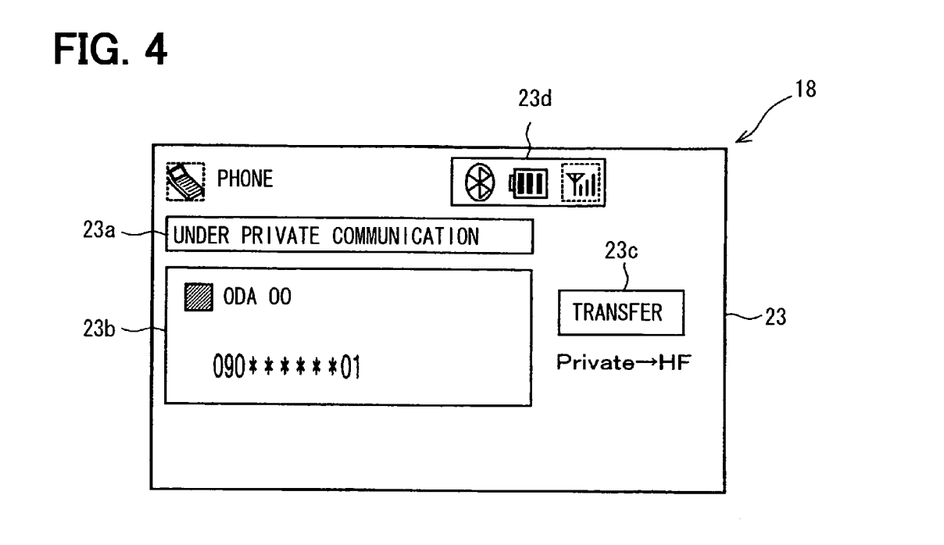
FIG. 4 is a schematic view showing an under private communication notice screen.

FIG. 4 shows a state where a user manipulates the response key of the cellular phone device 3 and responds to incoming call of the cellular phone device 3 via the private communication. When the control unit 4 determines that a user manipulates the response key of the cellular phone device 3, the control unit 4 causes the cellular phone device 3 to perform a response operation to the incoming call. In this case, the BT interface portion 5 and the cellular phone device 3 therebetween do not open a voice path. After the cellular phone device 3 changes, from the incoming call state to the private communication state, the control unit 4 changes the incoming call notice screen 21 shown in FIG. 2 to a under private communication notice screen 23 shown in FIG. 4. The under private communication notice screen 23 indicates the private communication state.

The control unit 4 causes a status display region 23a of the under private communication notice screen 23 to display a letter string of "Under Private Communication" to notify the private communication state. Further, the control unit 4 causes a sender information display region 23b to display the letter strings of "090******01" and "Oda OO" as information of the sender. Further, the control unit 4 causes the under private communication notice screen 23 to display a transfer switch 23c manipulated by a user to change the private communication to the handsfree communication. Further, the control unit 4 receives remaining power of a battery of the cellular phone device 3 and a reception status of electric wave from the cellular phone device 3. The control unit 4 causes a phone status display region 23d to display a remaining power icon and a reception status icon. The remaining power icon indicates the remaining power of the battery of the cellular phone device 3. The reception status icon indicates the reception status of electric wave.

Figure 5:
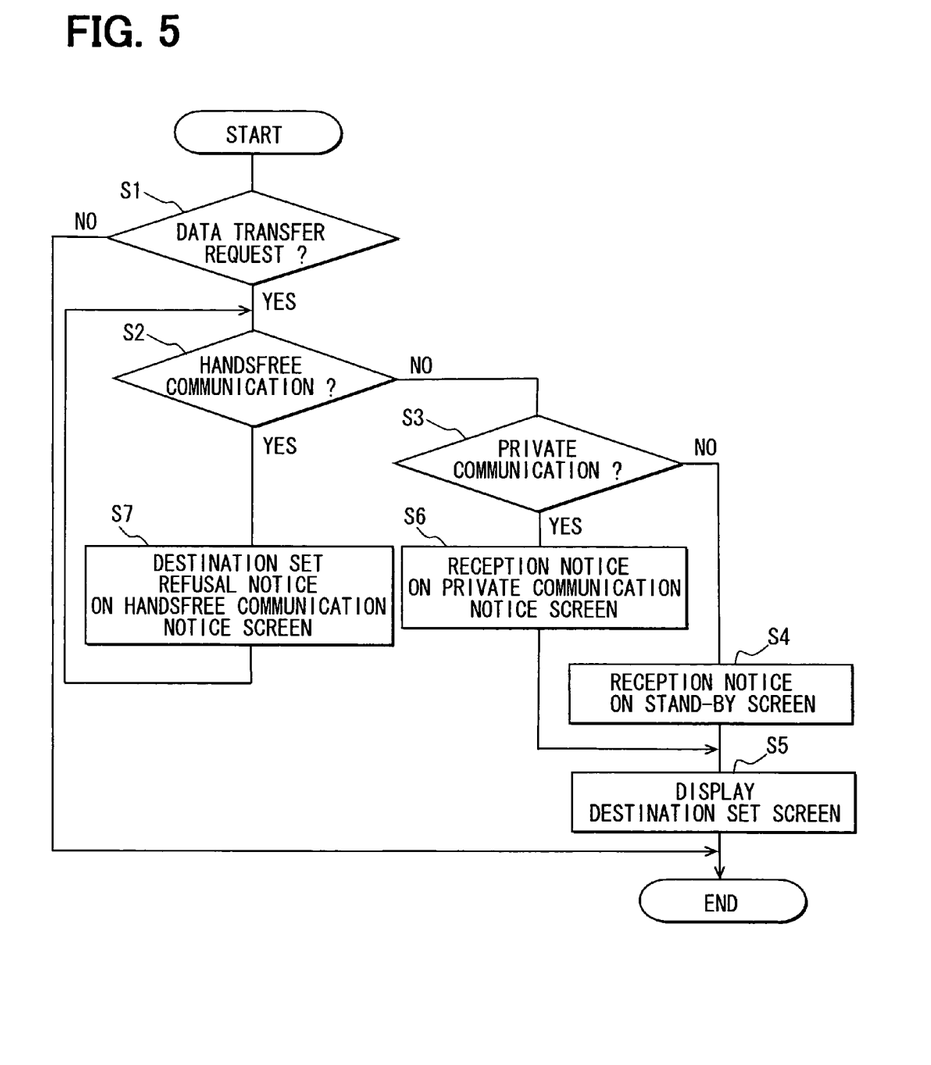
FIG. 5 is a flowchart showing an operation of the in-vehicle apparatus.

As follows, an operation of the above-described configuration will be described with reference to FIGS. 5 to 8. In the following example, a user manipulates the cellular phone device 3 to cause the cellular phone device 3 to transmit position data specifying the current position previously detected and stored to the in-vehicle navigation device 2. FIG. 5 is a flow chart showing an operation of the in-vehicle navigation device 2.

At step S1, the control unit 4 of the in-vehicle navigation device 2 starts a data transfer request detection operation to determine whether the cellular phone device 3 makes a data transfer request. At step S1, when the control unit 4 determines that:

i) a user does not cause the cellular phone device 3 to transmit the position data to the in-vehicle navigation device 2; and ii) the cellular phone device 3 does not make a data transfer request, step S1 makes a negative determination. In this case, the control unit 4 terminates the data transfer request detection operation, and the processing returns to another operation such as a main operation.

When the control unit 4 determines that: i) a user causes the cellular phone device 3 to transmit a position data to the in-vehicle navigation device 2; and ii) the cellular phone device 3 make a data transfer request according to a notice of state inputted from the cellular phone device 3, step S1 makes a positive determination. In this case, at step S2, S3, the control unit 4 determines whether the cellular phone device 3, which makes the data transfer request, is in either the handsfree communication state, the private communication state, or a stand-by state according to a notice of state inputted from the cellular phone device 3. In the stand-by state, the cellular phone device 3 is waiting incoming call.

When the control unit 4 determines that the cellular phone device 3, which makes the data transfer request, is not in the handsfree communication state according to the notice of state inputted from the cellular phone device 3, step S2 makes a negative determination. When the control unit 4 determines that the cellular phone device 3 is not in the private communication state according to the notice of state inputted from the cellular phone device 3, step S3 makes a negative determination. In this case, both steps S2, S3 make negative determinations, and the control unit 4 determines that the cellular phone device 3 is in the stand-by state. Subsequently, the control unit 4 causes the BT interface portion 5 to transmit a notice of data transfer permission to the cellular phone device 3 to permit a data transfer request from the cellular phone device 3. Thus, the control unit 4 permits reception of the position data from the cellular phone device 3. When the cellular phone device 3 receives the notice of data transfer permission from the in-vehicle navigation device 2 via the BT interface portion 5, the cellular phone device 3 transmits a position data specified by a user to the in-vehicle navigation device 2 via the BT interface portion 5.

At step S4, when the control unit 4 determines that the BT interface portion 5 receives the position data from the cellular phone device 3 in response to the permission of the position data from the cellular phone device 3, the control unit 4 causes a stand-by screen to cause a pop-up indication, e.g., display a pop-up window of a position data complete reception notice screen. The position data complete reception notice screen indicates a state where the position data is completely received from the cellular phone device 3. At step S5, the control unit 4 causes the display unit 18 to display a destination set screen 24 after elapse of a predetermined period such as several seconds subsequent to the pop-up indication of the position data complete reception notice screen on the stand-by screen. Specifically, as shown in FIG. 6, the destination set screen 24 indicates a point of the received position data close to a center for inquiring whether a user sets the point as a destination.

The control unit 4 causes the destination set screen 24 to indicate a detail switch 24a, an off-switch 24b, an indication change switch 24c, a destination set switch 24d, a point registration switch 24e, and a wide area detail switch 24f. The detail switch 24a is manipulated by a user to indicate a detailed map. The off-switch 24b is manipulated by a user to dismiss various touch switches. The indication change switch 24c is manipulated by a user to change indication of the map. The destination set switch 24d is manipulated by a user to set the point, which is specified by a marking close to the center of the destination set screen 24, as a destination. The destination set switch 24d is an example of a destination set unit. The point registration switch 24e is manipulated by a user to register the point specified by the marking close to the center of the destination set screen 24. The wide area detail switch 24f is manipulated by a user to indicate a wide area of the map. Thus, a user manipulates the destination set switch 24d of the destination set screen 24, and thereby the point specified by the position data received from the cellular phone device 3 can be set as a destination. Thereafter, a user may manipulate a route guidance switch (not shown) for starting route guidance, and thereby route guidance from the current position to the set destination can be performed.

Figure 7:
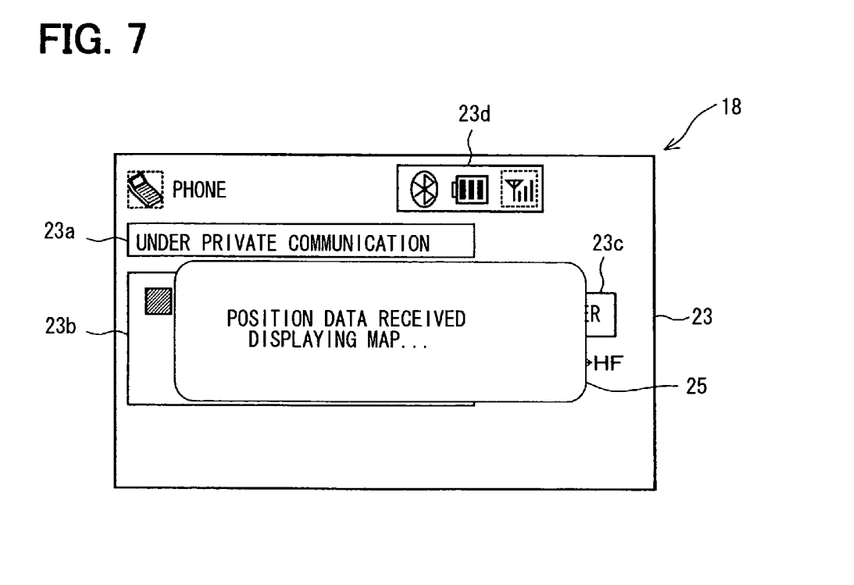
FIG. 7 is a schematic view showing a position data complete reception notice screen displayed on the under private communication notice screen.

When the control unit 4 determines that the cellular phone device 3, which makes the data transfer request, is in the private communication state according to the notice of state inputted from the cellular phone device 3, step S3 makes a positive determination. In this case, the control unit 4 causes the BT interface portion 5 to transmit a notice of data transfer permission to the cellular phone device 3 to permit a data transfer request from the cellular phone device 3. At step S6, when the control unit 4 determines that the BT interface portion 5 receives the position data from the cellular phone device 3 in response to the permission of the position data from the cellular phone device 3, the control unit 4 causes a under private communication notice screen to cause a pop-up indication, e.g., display a pop-up window of a position data complete reception notice screen. The position data complete reception notice screen indicates a state where the position data is completely received from the cellular phone device 3. That is, as shown in FIG. 4, when the control unit 4 displays the under private communication notice screen 23 on the display unit 18 and when the control unit 4 receives a data transfer request from the cellular phone device 3, the control unit 4 causes a state shown in FIG. 7. In FIG. 7, the control unit 4 causes the under private communication notice screen 23 to cause a pop-up indication, e.g., display a pop-up window of a position data complete reception notice screen 25. The position data complete reception notice screen 25 indicates a state where the position data is completely received from the cellular phone device 3.

Figure 6:
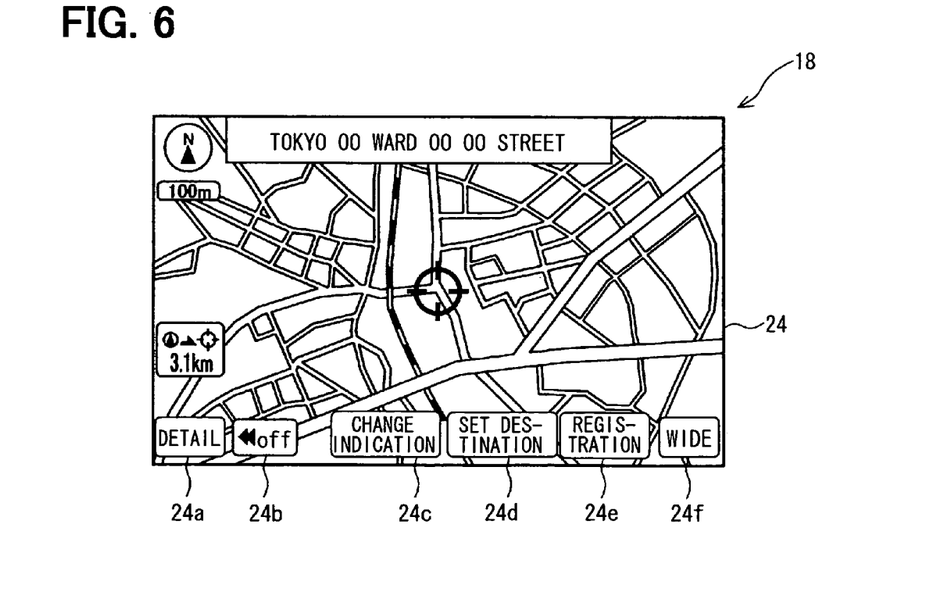
FIG. 6 is a schematic view showing a destination set screen.

And subsequently, as shown in FIG. 6, the control unit 4 displays the destination set screen 24 on the display unit 18, after elapse of a predetermined period such as several seconds subsequent to causing the pop-up indication of the position data complete reception notice screen 25 on the under private communication notice screen 23. A user manipulates the destination set switch 24d of the destination set screen 24 while performing a private communication, and thereby, the point specified by the position data received from the cellular phone device 3 can be set as a destination.

Figure 8:
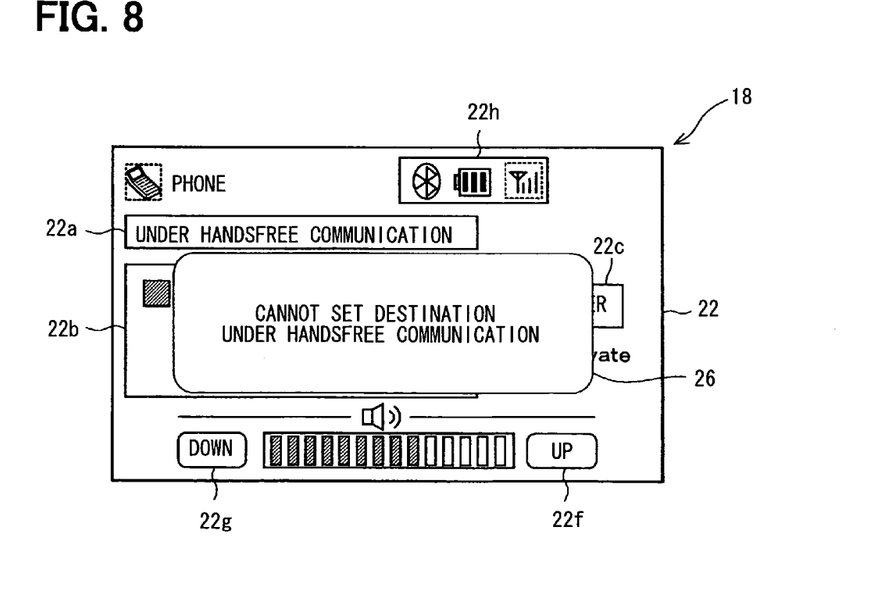
FIG. 8 is a schematic view showing a destination set refusal notice screen displayed on the under handsfree communication notice screen.

When the control unit 4 determines that the cellular phone device 3, which makes the data transfer request, is in the handsfree communication state according to the notice of state inputted from the cellular phone device 3, step S2 makes a positive determination. In this case, at step S7, the control unit 4 causes the BT interface portion 5 to transmit a notice of data transfer permission to the cellular phone device 3 to permit the data transfer request from the cellular phone device 3. However, the control unit 4 refuses reception of the position data transmitted from the cellular phone device 3. The control unit 4 cause a pop-up indication, e.g., display a pop-up window of a destination set refusal notice screen on the under handsfree communication notice screen. The destination set refusal notice screen indicates a state where setting of the destination by receiving position data from the cellular phone device 3 is refused in the handsfree communication. That is, as shown in FIG. 3, when the control unit 4 displays the under handsfree communication notice screen 22 on the display unit 18 and when the control unit 4 receives a data transfer request from the cellular phone device 3, the control unit 4 causes a state shown in FIG. 8. In FIG. 8, the control unit 4 causes the under handsfree communication notice screen 22 to cause a pop-up indication, e.g., display a pop-up window of a destination set refusal notice screen 26. The destination set refusal notice screen 26 indicates a state where a destination cannot be set in the handsfree communication.

Thereafter, the processing returns to step S2 and S3, and the control unit 4 again determines whether the cellular phone device 3, which makes the data transfer request, is in either the handsfree communication state, the private communication state, or the stand-by state. When the control unit 4 determines that the cellular phone device 3, which makes the data transfer request, is changed from the handsfree communication to the private communication state in response to manipulation of the transfer switch 22e of the under handsfree communication notice screen 22, step S3 makes a positive determination. In this case, the control unit 4 permits reception of the position data transmitted from the cellular phone device 3. At step S6, when the control unit 4 determines that the BT interface portion 5 receives the position data transmitted from the cellular phone device 3, the control unit 4 causes a state shown in FIG. 7. In FIG. 7, the control unit 4 causes the under private communication notice screen 23 to cause a pop-up indication, e.g., display a pop-up window of the position data complete reception notice screen 25. After elapse of a predetermined period subsequent to the display of the position data complete reception notice screen 25, at step S5, the control unit 4 causes the display unit 18 to display the destination set screen 24 shown in FIG. 6.

When the control unit 4 determines that the cellular phone device 3, which makes the data transfer request, is changed from the handsfree communication to the stand-by state in response to manipulation of the hang up switch 22d of the under handsfree communication notice screen 22, step S3 makes a negative determination. In this case, the control unit 4 permits reception of the position data transmitted from the cellular phone device 3. At step S4, when the control unit 4 determines that the BT interface portion 5 receives the position data transmitted from the cellular phone device 3, the control unit 4 causes the stand-by screen to cause a pop-up indication, e.g., display a pop-up window of the position data complete reception notice screen. After elapse of a predetermined period subsequent to the display of the position data complete reception notice screen, at step S5, the control unit 4 causes the display unit 18 to display the destination set screen 24 shown in FIG. 6.

In the above embodiment, in the in-vehicle navigation device 2, when the control unit 4 determines that the cellular phone device 3, which makes a data transfer request, is in the handsfree communication state, the control unit 4 refuses reception of the position data transmitted from the cellular phone device 3. Alternatively, the control unit 4 may transmit a notice of data transfer refusal to the cellular phone device 3, and thereby the control unit 4 may restrict the cellular phone device 3 from transmitting the position data. Alternatively, the control unit 4 may receive the position data transmitted from the cellular phone device 3 when the cellular phone device 3, which makes a data transfer request, is in any of the states. In this case, the control unit 4 may cause the display device to display the destination set screen when determining that the cellular phone device 3, which makes the data transfer request, is in the private communication state. In addition, the control unit 4 may not cause the display device to display the destination set screen when determining that the cellular phone device 3, which makes the data transfer request, is in the handsfree communication state. That is, the control unit 4 may determine whether to cause the display device to display the destination set screen or not, based on determination whether the cellular phone device 3, which makes the data transfer request, is in the private communication state or the handsfree communication state.

According to the present embodiment, the in-vehicle navigation device 2 communicates with the cellular phone device 3 using the HFP and the OPP, for example. When the cellular phone device 3, which makes the data transfer request, is in the private communication state, the in-vehicle navigation device 2 permits reception of the position data transmitted from the cellular phone device 3. Thereby, the in-vehicle navigation device 2 causes the display unit 18 to display the destination set screen 24 to inquire a user whether to set the point specified by the position data received from the cellular phone device 3 as a destination. Thus, a user can be provided with an application, which sets the point specified by the position data transmitted from the cellular phone device 3 as a destination. Alternatively, when the cellular phone device 3, which makes the data transfer request, is in the handsfree communication state, the in-vehicle navigation device 2 refuses reception of the position data transmitted from the cellular phone device 3, and thereby restricts the display unit 18 from displaying the destination set screen 24. Thus, a user can concentrate on driving of the vehicle.

Further, when the cellular phone device 3, which makes a data transfer request, is changed from the handsfree communication state to the private communication state or the stand-by state, the in-vehicle navigation device 2 permits reception of the position data from the cellular phone device 3 thereby to cause the display unit 18 to display the destination set screen 24. Thus, a user can be provided with an application, which sets the point specified by the position data transmitted from the cellular phone device 3 as a destination, in response to manipulation of a user to change from the handsfree communication to the private communication or manipulation of a user to terminate the handsfree communication.

In the above embodiment, the position data obtained using the cellular phone device is transmitted from the cellular phone device, and the point specified by the position data is set as a destination. Alternatively, various data obtained or stored in the cellular phone device may be transmitted from the cellular phone device, and information specified by the various data may be displayed. In this case, the in-vehicle apparatus having a handsfree function need not have a navigation function, and it suffices that the in-vehicle apparatus has a display function.

In the above embodiment, the display device has a touch sensor including the transfer switch manipulated to change the private communication to the handsfree communication, the transfer switch manipulated to change the handsfree communication to the private communication, the response switch manipulated to respond to an incoming call, the response refusal switch manipulated to refuse incoming call, and the like. Alternatively, the transfer switches, the response switch, the response refusal switch, and the like may be mechanical switches, for example. In this case, the mechanical switches may be, for example, located in an area close to the handle or an area between a driver's seat and a passenger seat. In that case, a display device may display an operating procedure of the switches.

The indication regions and the switches in the notice screens may be in other layout. In the above embodiment, the in-vehicle apparatus having the handsfree function determines whether to receive the position data transmitted from the cellular phone device or refuse the position data in response to determination of the state of the cellular phone device. Alternatively, the cellular phone device may determine the state of the cellular phone device and may determine whether to transmit the position data according to the determined state. Specifically, when the cellular phone device is in the private communication state and when a data transfer request occurs, the cellular phone device may transmit the position data to the in-vehicle apparatus having the handsfree function, thereby to cause the in-vehicle apparatus to display the destination set screen. Alternatively, when the cellular phone device is in the handsfree communication state and when a data transfer request occurs, the cellular phone device may not transmit the position data to the in-vehicle apparatus, thereby not to cause the in-vehicle apparatus to display the destination set screen. In such a structure, a user can concentrate on a driving operation when the cellular phone device, which makes a data transfer request, is in the handsfree communication state.

In the above in-vehicle apparatus having a handsfree function, a communication unit is configured to communicate with a cellular phone device simultaneously using a handsfree communication protocol and a data transfer protocol for data transfer. The cellular phone device is selectable one of:

i) a handsfree communication state in which voice inputted via a voice input unit of the in-vehicle apparatus is transmitted as outgoing voice to a counterpart, and voice transmitted as incoming voice from a counterpart is outputted via a voice output unit of the in-vehicle apparatus by opening a voice path with the in-vehicle apparatus in a condition where communicating with the in-vehicle apparatus using a handsfree communication protocol for handsfree communication; and ii) a handset communication state in which voice inputted via a voice input unit of the cellular phone device is transmitted as outgoing voice to a counterpart, and voice transmitted as incoming voice from a counterpart is outputted via a voice output unit of the cellular phone device by closing the voice path with the in-vehicle apparatus.

A data transfer request determination unit is configured to determine whether the cellular phone device, which communicates with the communication unit using the data transfer protocol, makes a data transfer request. A condition determination unit is configured to determine whether the cellular phone device, which communicates with the communication unit using the handsfree communication protocol, selects one of the handsfree communication state and the handset communication state. A control unit is configured to permit the data transfer request from the cellular phone device in a condition where:

the data transfer request determination unit determines that the cellular phone device, which communicates with the communication unit using the data transfer protocol, makes the data transfer request; and the condition determination unit determines that the cellular phone device, which makes the data transfer request, selects the handset communication state.

The control unit is configured not to permit the data transfer request from the cellular phone device in a condition where:

the condition determination unit determines that the cellular phone device, which makes the data transfer request, selects the handsfree communication state.

In the present structure, when the cellular phone device is in the handset communication state and when the cellular phone device makes a data transfer request, the in-vehicle apparatus permits the data transfer request from the cellular phone device. Thereby, an application relating to the data transfer from the cellular phone device can be provided to a user of the vehicle. On the other hand, when the cellular phone device makes a data transfer request and when the cellular phone device is in the handsfree communication state, the in-vehicle apparatus does not permit the data transfer request from the cellular phone device. Thereby, a user of the in-vehicle apparatus can concentrate on a driving operation of the vehicle.

In the above in-vehicle apparatus having a handsfree function, the control unit permits the data transfer request from the cellular phone device in a condition where: the condition determination unit determines that the cellular phone device, which makes the data transfer request, is changed from the handsfree communication state to the handset communication state, subsequent to a condition where the data transfer request determination unit determines that the cellular phone device, which communicates with the communication unit using the data transfer protocol, makes the data transfer request; and the condition determination unit determines that the cellular phone device, which makes the data transfer request, selects the handsfree communication state.

In the present structure, an application relating to the data transfer from the cellular phone device can be provided to a user subsequent to change in the cellular phone device from the handsfree communication state to the handset communication state in response to manipulation of a user to change the cellular phone device from the handsfree communication to the handset communication.

In the above in-vehicle apparatus having a handsfree function, the control unit permits the data transfer request from the cellular phone device in a condition where: the condition determination unit determines that the cellular phone device, which makes the data transfer request, is changed from the handsfree communication state to the stand-by state, subsequent to a condition where the data transfer request determination unit determines that the cellular phone device, which communicates with the communication unit using the data transfer protocol, makes the data transfer request; and the condition determination unit determines that the cellular phone device, which makes the data transfer request, selects the handsfree communication state.

In the present structure, an application relating to the data transfer from the cellular phone device can be provided to a user subsequent to change in the cellular phone device from the handsfree communication state to the stand-by state in response to termination of the handsfree communication.

In the above in-vehicle apparatus having a handsfree function, the control unit permits the data transfer request from the cellular phone device by: causing the position data reception unit to receive the position data transmitted from the cellular phone device; and providing a user with a destination set unit to enable a user to determine whether to set a point specified by the received position data to the destination.

In the present structure, an application, which relates to the data transfer from the cellular phone device and enables a user to determine whether to set a point specified by the received position data to the destination can be provided to a user.

The cellular phone device is configured to communicate with an in-vehicle apparatus having a handsfree function simultaneously using a handsfree communication protocol for handsfree communication and a data transfer protocol for data transfer.

The cellular phone device is selectable one of:

i) a handsfree communication state in which voice inputted via a voice input unit of the in-vehicle apparatus is transmitted as outgoing voice to a counterpart, and voice transmitted as incoming voice from a counterpart is outputted via a voice output unit of the in-vehicle apparatus by opening a voice path with the in-vehicle apparatus in a condition where communicating using the handsfree communication protocol; and ii) a handset communication state in which voice inputted via a voice input unit of the cellular phone device is transmitted as outgoing voice to a counterpart, and voice transmitted as incoming voice from a counterpart is outputted via a voice output unit of the cellular phone device by closing the voice path with the in-vehicle apparatus.

The cellular phone device is configured to perform data transfer to the in-vehicle apparatus in a condition where:

the cellular phone device communicates with the in-vehicle apparatus simultaneously using the handsfree communication protocol and the data transfer protocol; and the cellular phone device is in the handset communication state; and the cellular phone device makes a data transfer request to the in-vehicle apparatus.

The cellular phone device is configured not to perform data transfer to the in-vehicle apparatus in a condition where:

the cellular phone device is in the handsfree communication state; and the cellular phone device makes a data transfer request to the in-vehicle apparatus.

In the present structure, when the cellular phone device sets the handset communication state and when the cellular phone device makes a data transfer request, a user can be provided with an application relating to the data transfer in response to data transfer to the in-vehicle handsfree device. Oh the other hand, when the cellular phone device sets the handsfree communication state and when the cellular phone device makes a data transfer request, data transfer is not performed to the in-vehicle apparatus. Thus, a user is not provided with an application relating to the data transfer, and thereby the user can concentrate on a driving operation.

The above structures of the embodiments can be combined as appropriate.

The above processings such as calculations and determinations are not limited being executed by the control unit 4. The control unit may have various structures including the control unit 4 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An in-vehicle apparatus having a handsfree function, the in-vehicle apparatus comprising:

a communication unit configured to communicate with a cellular phone device simultaneously using a handsfree communication protocol for handsfree communication and a data transfer protocol for data transfer, the cellular phone device being selectively in one of:

i) a handsfree communication state where outgoing voice inputted via a voice input unit of the in-vehicle apparatus is transmitted to a counterpart and incoming voice transmitted from a counterpart is outputted via a voice output unit of the in-vehicle apparatus when opening a voice path with the in-vehicle apparatus and when communicating with the in-vehicle apparatus using a handsfree communication protocol; and ii) a handset communication state where outgoing voice inputted via a voice input unit of the cellular phone device is transmitted to a counterpart, and incoming voice transmitted from a counterpart is outputted via a voice output unit of the cellular phone device when closing the voice path with the in-vehicle apparatus;

a request determination unit configured to determine whether the cellular phone device, which communicates with the communication unit using the data transfer protocol, makes a data transfer request;

a condition determination unit configured to determine whether the cellular phone device, which communicates with the communication unit using the handsfree communication protocol, is in one of the handsfree communication state, the handset communication state, and a stand-by state where the cellular phone device waits incoming call; and a control unit configured to i) permit the data transfer request from the cellular phone device in a condition where:

the request determination unit determines that the cellular phone device, which communicates with the communication unit using the data transfer protocol, makes a data transfer request; and the condition determination unit determines that the cellular phone device is in the handset communication state, ii) refuse the data transfer request from the cellular phone device in a condition where:

the condition determination unit determines that the cellular phone device is in the handsfree communication state, and iii) permit the data transfer request from the cellular phone device in a condition where:

the condition determination unit determines that the cellular phone device is changed from the handsfree communication state to the stand-by state, subsequent to a condition where:
   the request determination unit determines that the cellular phone device is in the handsfree communication state.

2. The in-vehicle apparatus according to claim 1, wherein the control unit is configured to permit the data transfer request in a condition where:
   the condition determination unit determines that the cellular phone device is changed from the handsfree communication state to the handset communication state, subsequent to a condition where:
      the request determination unit determines that the cellular phone device, which communicates with the communication unit using the data transfer protocol, makes the data transfer request; and
      the condition determination unit determines that the cellular phone device is in the handsfree communication state.

3. The in-vehicle apparatus according to claim 1, further comprising:
   a current position acquisition unit configured to obtain a current position of a vehicle;
   a route guide unit configured to perform route guidance from the current position obtained using the current position acquisition unit to a destination; and
   a position data reception unit configured to receive position data transmitted from an outside,
   wherein the control unit is configured to cause the position data reception unit to receive the position data transmitted from the cellular phone device and provide a user with a destination set unit to enable the user to determine whether to set a point specified by the received position data to the destination, in response to permission of the data transfer request from the cellular phone device.

4. The in-vehicle apparatus according to claim according to claim 3,
   wherein the control unit is configured to refuse the data transfer request in a condition where:
      the request determination unit determines that the cellular phone device, which communicates with the communication unit using the data transfer protocol, makes the data transfer request; and
      the condition determination unit determines that the cellular phone device is in the handsfree communication state, and
   the control unit is configured to cause a pop-up indication of a destination set refusal notice screen on an under handsfree communication notice screen, the destination set refusal notice screen indicating a state where setting of the destination by receiving position data from the cellular phone device is refused in the handsfree communication state.

* * * * *